Nov. 10, 1936.            H. B. SCOTT            2,060,249
MECHANICAL CLUTCH
Filed July 14, 1933
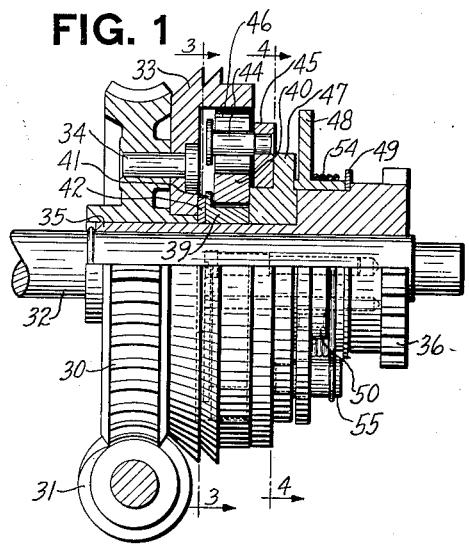
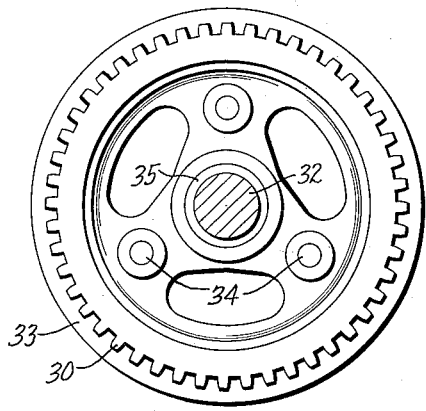
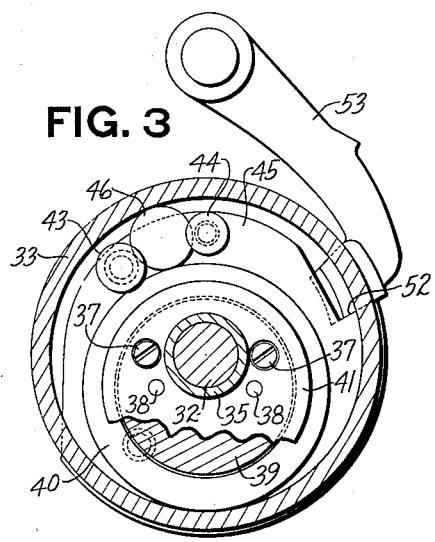
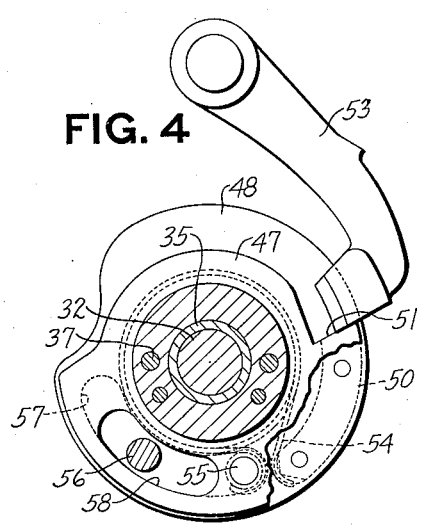
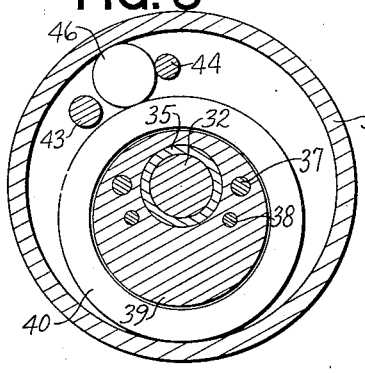
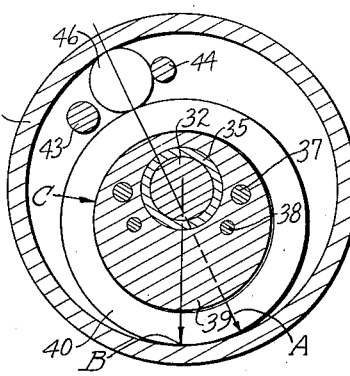
Inventor
Howard B. Scott
By Earl Beust
His Attorney Patented Nov. 10, 1936

2,060,249

UNITED STATES PATENT OFFICE 2,060,249

MECHANICAL CLUTCH

Howard B. Scott, Dayton, Ohio, assignor to The National Cash Register Company, Dayton, Ohio, a corporation of Maryland Application July 14, 1933, Serial No. 680,348

6 Claims. (Cl. 192—27)

This invention relates to clutches, and has for a main object the production of a simple and reliable clutch.

Another object of the present invention is the production of a clutch having a plurality of members arranged so that the points of contact between all of said members is continually changing.

Another object is to improve the type of clutch used in cash registers, accounting machines and other types of power driven machines, by providing novel means, including a driving roller and ring intermediate the main driving and driven members of the clutch.

Another object of this invention is to produce a friction clutch in which the point of contact between the driving roller and ring changes each time the clutch functions, thus eliminating excessive wear in one position on the roller or the ring.

Another object is to produce a friction clutch with the driven member thereof so arranged relatively to the driving ring that said driven member reinforces the driving ring when extreme load is put upon the ring.

A further object is to eliminate the usual springs which are used to aid in forcing the driving rollers of previous types of clutches into frictional contact with the driving member, and use a "floating" driving roller.

Still another object is to so locate the ring relative to the driven member of the clutch that said ring is normally "free" and therefore will be turned slightly by the driving member of the clutch each time the clutch is released to function.

Another object of this invention is to provide an easy and positive release of the driving roller and ring when the driven member of the clutch is stopped.

With these and incidental objects in view the invention consists in certain novel features of construction and combinations of parts, the essential elements of which are set forth in appended claims, and a preferred form of embodiment of which is hereinafter specifically described with reference to the drawing which accompanies and forms part of this specification.

Of said drawing:

Fig. 1 is a partial edge view and section of the entire clutch.

Fig. 2 is a view of the clutch driving member.

Fig. 3 is a section on line 3—3 of Fig. 1 looking in the direction of the arrows and shows the parts in their normal positions.

Fig. 4 is a section on line 4—4 of Fig. 1, looking in the direction of the arrows and shows the parts in their normal positions.

Fig. 5 shows the driving and driven clutch members in section, and the driving roller and ring in the positions they assume immediately after the clutch is released to function.

Fig. 6 shows the driving and driven clutch members in section, and the driving roller and ring in the positions they assume at the instant they are locked in driving position.

General description

Described in general terms the clutch consists of a driving worm wheel operated from a worm driven by any suitable power such as an electric motor. The worm wheel is rigidly secured to a driving shell. Eccentrically mounted inside the clutch shell is a driven member and intermediate this clutch shell and the driven member is a freely mounted or "floating" driving roller and a driving ring, which are adapted to be frictionally locked to the inner wall of the clutch shell to positively drive the eccentrically mounted driven member, the stop cam, switch cam, clutch roll disk and gear for operating a cash register, accounting machine, adding machine, or any other type of mechanism to which the clutch as a whole may be attached.

The principal distinction between the clutch disclosed herein and those known in the prior art, is that instead of clutching the driving shell to the driven member, the floating roller and driving ring are clutched to the driving shell, thus forming a driving connection between the ring and driven member. The principal advantage of such a driving connection is that there is no twist applied to the driven shaft, the forces applied to the shaft acting as a lever rather than a clutch.

Associated with the switch cam, stop cam, and clutch roll disk to be hereinafter described in detail is what is known in the art as a switch lock arm or clutch stop arm. This stop arm cooperates with the stop cam, the switch cam and the clutch roll disk in the manner substantially illustrated and described in the United States Letters Patent to Charles F. Kettering and W. A. Chryst, No. 1,144,418, issued June 29, 1915.

Detailed description

It may be said that this invention consists of constantly revolving elements, such as a worm wheel 30 and a worm 31 driven by any suitable power, for example an electric motor, such as that described in the above mentioned Kettering and Chryst patent. The invention may be connected to any machine or apparatus, such as cash registers, accounting machines and the like, to be driven by a springless operated friction clutch.

The entire clutch mechanism is mounted on a support stud or shaft 32. The clutch driving member includes a clutch shell 33 (Figs. 1 to 3, 5 and 6) secured to the worm wheel 30 by studs 34. The clutch shell 33 is mounted on a hub of the worm wheel 30 and the worm wheel in turn is mounted on a sleeve 35 of a gear 36, which gear may be meshed with the driving train of gears of any of the above mentioned types of machines which are adapted to be operated by a friction clutch.

Eccentrically mounted on the sleeve 35 and secured to the gear 36 by screws 37 and dowel pins 38 is what might be termed the driven member 39 of the clutch.

Surrounding the driven member 39 is a driving ring 40. The inside diameter of the ring 40 is somewhat larger than the diameter of the driven member 39, thus providing clearance between the two. They are so located that in the normal positions of the parts the periphery of the driving ring 40 may rest on the inner wall of the clutch shell 33, and in these positions the clearance between the inside diameter of the ring and the periphery of the driven member is substantially equal all way around. The driven member 39 has a flange 41 to aid in maintaining the driving ring 40 in its proper lateral position. Between the driven member 39 and the hub of the worm wheel 30 and the bottom inside surface of the clutch shell 33 is a spacing washer 42 shown only in Fig. 1.

"Floating" freely between headed studs 43 and 44 carried in a clutch roll disk 45 is a driving roller 46 which normally rests in the position shown in Fig. 3. In this position the driving roller 46 touches the periphery of the driving ring 40 and body of the stud 43 but clears the inner wall of the clutch shell 33 and the body of stud 44.

From the above description it can be clearly seen that due to the novel arrangement of the driving and driven members, the driving ring 40 is reinforced when under extreme load, by the driven member 39. Moreover when under normal load the roller 46 is elastically held by the ring 40 as the latter when under normal load is under tension within the bounds of its elastic limit.

Another highly desirable feature due to the novel arrangement of the parts is that the resultant force A (Fig. 6) through the points of contact of the shell 33 roller 46 and ring 40 passes through the center of the ring and due to the ring's eccentric location, relative to the shell 33, that force is outside the point of contact B between the ring 40 and shell 33, and therefore, the force A tends to rotate the ring 40 clockwise and disengage or release the roller 46, ring 40 and shell 33 from their driving positions. This however is prevented due to the fact that the force of the driving load is applied by the ring 40 to the member 39 at the point C. But as soon as the driving load is released, then said resultant force A aids in releasing the roller 46 and ring 40 from their driving positions. Due to the fact that there is no spring pushing the roller 46, as is the case in many of the clutches now used, the release of the roller 46 and ring 40 from "driving" to "free" position is accomplished with the minimum amount of force.

The clutch roll disk 45 is mounted on the hub of a stop cam 47, which in turn is mounted on the sleeve 35 of the gear 36 and rigidly secured to the gear 36 and driven member 39 by the screws 37.

Mounted on the hub of the gear 36 and adjacent the stop cam 47 is a switch cam 48. A retaining washer 49 is also mounted on the hub of the gear 36, adjacent the hub of the switch cam 48, as shown in Fig. 1. Secured to the side of the switch cam 48 is a stopping block 50 (Figs. 1 and 4). The working edge of the stopping block 50 coincides with a shoulder 51 of the stop cam 47 and a shoulder 52 of the clutch roll disk 45. Cooperating with the stopping block 50 and shoulders 51 and 52 are the tines of the usual clutch stop arm 53, which arm is shown in the normal position in Figs. 3 and 4, wherein by the contact of its tines with the block 50 and shoulders 51 and 52 it maintains the parts in the positions shown in Figs. 3 and 4. A torsion spring 54 (Figs. 1 and 4) is wrapped around the hub of the switch cam 48, one end of the spring 54 being wrapped around a stud 55 carried by the stop cam 47, and the other end being wrapped around the lower end of the stopping block 50, as is clearly shown in Fig. 4. The clutch roll disk 45 carries a limiting stud 56 shown only in Fig. 4. This stud projects through a curved slot 57 in the switch cam 48 and a curved slot 58 in the stop cam 47.

*Operation*

The operation of the clutch is as follows: It will be recalled that the stopping block 50 and the stopping shoulders 51 and 52 are in alinement with each other, thereby, through the stop arm 53, maintaining the clutch parts in their normal positions as shown in Figs. 3 and 4. The switch cam 48 and stop cam 47 are smaller in diameter than is the clutch roll disk 45, at the point where the arm 53 is normally engaged by said cams and disk (Figs. 3 and 4), and consequently when the arm 53 is rocked in a counter-clockwise direction to release the clutch to drive the machine in a manner which is fully illustrated and described in United States Letters Patent No. 1,619,796, granted on March 1, 1927 to B. M. Shipley, the switch cam and stop cam are released to the action of the spring 54 to close the circuit through the motor, whereupon the worm 31 immediately starts to drive the worm wheel 30 and clutch shell 33.

By the time the switch cam 48 has operated the switch, the end wall of the slot 57 contacts the stud 56, and at this time the arm 53 has moved away from the shoulder 52 of the disk 45, and since the stud 56 is carried by said disk, the latter is turned counter-clockwise (Fig. 3), whereupon the stud 44 moves the roll 46 into the position shown in Fig. 5. At this stage in the operation the ring 40 is still substantially central with the driven member 39 so that the clearances are practically as shown in Fig. 5, evenly divided all around.

Almost instantly after the release of the clutch roll disk 45, the shell 33, being turned counter-clockwise by the worm 30, forces the roller 46 toward the left, and at the same time the bottom inside wall of the clutch shell 33, being in contact with the driving ring 40, tends to turn that ring slightly counter-clockwise, and in so doing, in combination with the movement of the roller 46 toward the left by the upper inside wall as viewed in Figs. 5 and 6 of the clutch shell 33, the ring 40 is moved from the position shown in Fig. 5 to that shown in Fig. 6, wherein all of the clearance is taken up on the left-hand side of the ring 40 as viewed in Fig. 6. When this occurs, then the pressure of the roller 46 against the upper side of the ring 40, in combination with the pressure of the shell with the bottom part of the ring 40, drives the driven member 39 counter-clockwise. In other words, at this time the shell 33, roller 46 and ring 40 operate as a single unit to drive the member 39, to which it will be recalled is secured the stop cam 47 and the gear 36, which is or may be meshed with any cash register, accounting machine, or other machines which are adapted to be driven by power means.

The wedging of the roller 46 and ring 40 firmly against the inside walls of the shell 33, to cause these three elements to move as a unit, constitutes an important feature of the present invention. This wedging effect causes the ring to act as an abutment on the shell to drive the member 39 by applying force at the point C Fig. 6, thus acting as a lever to drive the member 39. This distinguishes from the prior art where the driven member, such as applicant's member 39, is wedged directly to the driving shell. This wedging of the driven member directly to the driving shell causes an undesirable twisting in the driven shaft.

Due to the fact that the ring 40 is turned slightly each time the clutch functions, it can be clearly seen that the point of contact between the driving roller 46 and the driving ring 40 is continually changing. Also the points of contact between the roller 46 and shell 33 and between the ring 40 and shell 33 is continually changing and therefore, there will be no excessive wear in any one spot either on the roller 46, the ring 40 or shell 33 and consequently the wearing of the parts of this clutch is reduced to a minimum.

On the other hand, and as previously stated due to the novel relations of the parts the clutch is very easily released. When under extreme load it will not jam to such an extent that it is hard to free the same when the arm 53 is brought back into the position shown in Figs. 3 and 4 to stop the machine at the end of its normal operation. When the arm 53 is moved back into stopping position, the stopping block 50 strikes the tine of the arm 53 before the roll disk shoulder 52 strikes its associated tine of the arm 53 thus removing the driving load from the ring 40. The contact of block 50 with arm 53 turns cam 48 clockwise towards the normal position shown in Fig. 4, and immediately after this movement of cam 48 begins, the roll disk is free as all tension of spring 54 has been released. Consequently the disk 45 practically "floats" on the hub of cam 47, and therefore when shoulder 52 contacts arm 53, the roller 46 is instantly moved out of frictional locking position by the stud 43.

Nothing has been shown in this application for moving the arm 53 in and out, but that mechanism is old and well known in the art and if it is desired to have a description of the operation of such arm, as well as an illustration, reference may be had to the above mentioned Shipley Patent No. 1,619,796.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. A clutch comprising a driving member and a driven member adapted to be connected to and disconnected from each other at will, said driven member being mounted eccentrically relative to the driving member; a ring surrounding the driven member and loosely contacting the driving member; and means intermediate the driving member and the ring to force said ring into wedging contact with the driving member.

2. In a clutch, the combination of a driving member; a driven member mounted eccentrically thereto; means surrounding said driven member; a roller cooperating with said means to actuate the driven member; supporting means for said roller and normally maintaining the roller in an ineffective position; an arm movable out of the path of said supporting means but normally positioned to be engaged by the supporting means and stop the same; means carried by said supporting means to move said roller into an effective position when said arm is moved away from the supporting means; a device normally held under spring tension by said arm; and a projection carried by said supporting means and adapted to be operated by said device to actuate the supporting means when said arm is moved away from the supporting means and the device.

3. In a clutch, the combination of a driving member; a driven member mounted eccentrically thereto; means surrounding said driven member; a roller cooperating with said means to actuate the driven member; supporting means for said roller and normally maintaining the roller in an ineffective position; an arm movable out of the path of said supporting means but normally positioned to be engaged by the supporting means and stop the same; a device normally held under spring tension by said arm; and a projection carried by said supporting means and adapted to be operated by said device to actuate the supporting means when said arm is moved away from the supporting means and the device.

4. In a clutch, the combination of a driving member; a driven member mounted eccentrically thereto; means surrounding said driven member; a roller cooperating with said means to actuate the driven member; supporting means for said roller and normally maintaining the roller in an ineffective position; an arm movable out of the path of said supporting means but normally positioned to be engaged by the supporting means and stop the same; means carried by said supporting means to move said roller into an effective position when said arm is moved away from the supporting means; a device normally held under spring tension by said arm; a projection carried by said supporting means and adapted to be operated by said device to actuate the supporting means when said arm is moved away from the supporting means and the device; and a second means carried by the supporting means to move the roller into its ineffective position when said supporting means is stopped in its normal position by said arm.

5. The combination of a clutch comprising a shell, a ring and a roller, means to control the roller to cause the ring and roller to be frictionally held within the shell to cause the shell, ring and roller to move as a unit, and a member mounted within the ring to be driven by the ring when the shell, ring and roller are frictionally held together.

6. In a clutch, a shell, a ring mounted eccentrically within the shell, a roller mounted within the shell, means to wedge the roller between the ring and shell to cause the ring to contact the shell, the ring and roller being so arranged that the point of contact of the ring with the shell lies outside a line extending through the centers of the roller and ring.

HOWARD B. SCOTT.